United States Patent [19]

Botsolas

[11] Patent Number: 4,627,995

[45] Date of Patent: Dec. 9, 1986

[54] FIBERGLASS INSULATION WRAP FOR INSULATING A PIPE ELBOW

[75] Inventor: Chris J. Botsolas, St. Petersburg, Fla.

[73] Assignee: Carol Botsolas, St. Petersburg, Fla.

[21] Appl. No.: 745,418

[22] Filed: Jun. 14, 1985

Related U.S. Application Data

[63] Continuation of Ser. No. 535,911, Sep. 26, 1983, Pat. No. 4,553,308.

[51] Int. Cl.⁴ ................................................ F16I 9/22
[52] U.S. Cl. ...................................... 428/43; 138/149; 174/124 R; 285/47; 428/920
[58] Field of Search ................ 428/43, 228, 280, 920; 285/47; 252/62; 174/124 G, 124 R; 138/149

[56] References Cited

U.S. PATENT DOCUMENTS 3,620,258 11/1971 Graham ........................... 138/178

Primary Examiner—John E. Kittle
Attorney, Agent, or Firm—Hedman, Gibson, Costigan & Hoare

[57] ABSTRACT

There is disclosed fiberglass insulation for use in insulating a pipe elbow, the insulation comprises a continuous strand of a plurality of removably connected fiberglass wraps, each of said wraps comprises a pair of opposed ends having essentially the same width and a mid-section between the opposed ends having opposed arcuate sides wherein the width of the mid-section measured at any point along the opposed arcuate sides is greater than the width of the opposed ends. Also included as part of the present invention are the individual wraps which comprise the continuous strand of fiberglass insulation.

8 Claims, 9 Drawing Figures

FIG. 7
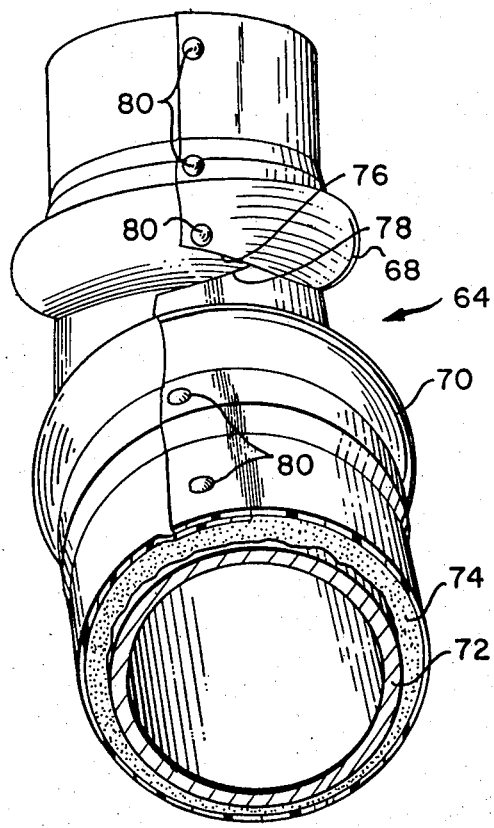
PRIOR ART
FIG. 8
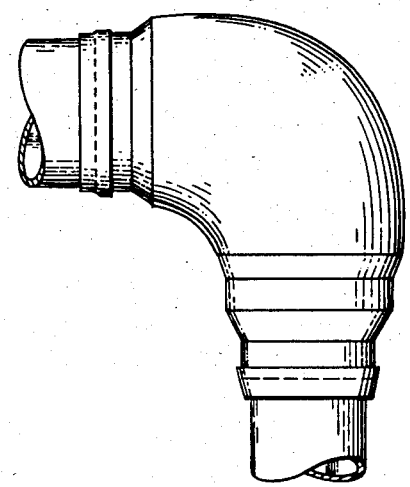
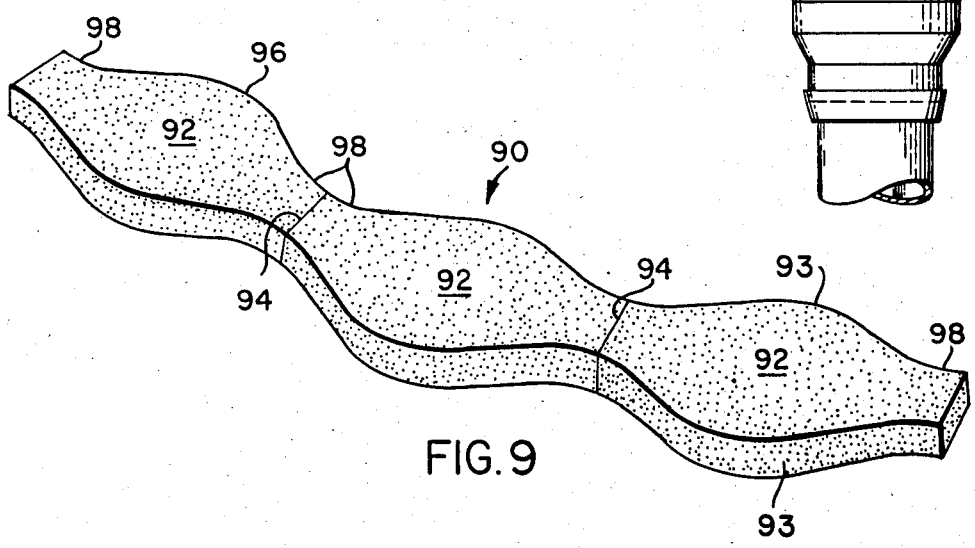
FIG. 9

FIBERGLASS INSULATION WRAP FOR INSULATING A PIPE ELBOW

This is a continuation of U.S. application Ser. No. 535,911 filed Sept. 26, 1983, now U.S. Pat. No. 4,553,308.

BACKGROUND OF THE INVENTION

1. Field of the Invention

This invention relates generally to pipe fitting covers, a process for covering pipe fittings and to fiberglass insulation for use in insulating pipe elbows. More specifically, the invention relates to pipe fitting covers designed specifically to cover fitting members joined by clamps, flanges, or other devices that protrude from the contour of the piping assembly. Further, the invention relates to a continuous strand of fiberglass comprising a plurality of removably connected individual fiberglass wraps which are uniquely designed to wrap around a pipe elbow to maximize the insulation value in the vicinity of the pipe elbow.

2. Description of the Prior Art

In virtually every instance wherein a cold or hot fluid is being conveyed through piping, insulation of the piping is desirable. It has long been the custom to wrap or place the insulation over the exterior of the piping and to cover the insulation. Insulated piping is covered to further improve the insulation and to enhance appearance.

Early efforts at insulating piping were directed to spreading layers of cement in place by hand on the piping and the pipe fittings and then adhering a fabric thereover followed by additonal coating layers. This procedure was expensive and time consuming. Another method is shown in U.S. Pat. No. 3,620,258 (Graham) which describes the use of a wedge shaped annular element made of resin bonded glass or other mineral fiber in which the fibers are perpendicular to the axes of the elements so that the fibers are axially compressible. While the Graham invention is an improvement over the spreading of cement-fabric layers, nonetheless, the Graham invention is uneconomical and has a significantly reduced insulation value because the axially oriented fibers permit unacceptable heat loss.

It is also known in the art to use a diamond-shaped wrap to insulate a pipe elbow. Such wraps have a pair of opposed points which join in vicinity of the inner radius of the pipe elbow. One such diamond-shaped wrap is produced by Zeston®, Inc. Such diamond-shaped wraps suffer from two primary disadvantages. First, the additional insulation located in the area of the two opposed points of the diamond are a waste of material because they do not add to the insulation value of the wrap. Second, the opposed points of the diamond-shaped wrap tend to bunch up when wrapped around the elbow especially in the vicinity of the inner radius of the elbow. This requires that the insulation be compressed which reduces the R-value. This bunching affect may also require a thicker more expensive type of fitting cover to be employed and more expensive fastening means to fasten the ends of the fitting cover in place.

Thereafter, aluminum and plastic covers for both the piping and the various fittings such as elbows, tees, valves and couplings were provided both with insulating material secured therein and without any insulation. In the instances wherein the insulating materials are adhered to the fitting covers, the insulation and fitting are joined in place at the same time. In those instances where the cover is separate from the insulation, the insulation is usually first formed about the piping and the pipe fittings and thereafter the aluminum or plastic covers are secured over the insulation.

The problem of covering flanged fittings or piping at any point at which a protrusion extends from the streamline surface of a piping assembly has been dealt with for many years. Further, in recent years, mechanical grooved type externally coupled fittings, such as manufactured by VICTAULIC® Co. and others have been used more frequently in piping assemblies that require insulation. An illustration of an effort to achieve a fitting cover capable of covering and accommodating insulation over the flanged or protruding portions of piping, is seen in U.S. Pat. No. 3,732,894 (Botsolas, May 15, 1973). Therein, the elbow fitting cover is sized to have a uniform inner and outer radius defined by the flange or protrusion on the piping. Further, step collars on the ends of the fitting covers are provided with this cover to facilitate joining the elbow cover or other fitting cover to the pipe extending from the fitting. Similar fitting covers with multiple stepped reducers such as seen in U.S. Pat. No. 3,153,546 (Dunn, October 1964) are also known.

Another effort at covering fittings joined by protruding flanges is illustrated by the fitting covers as seen in U.S. Pat. No. 3,732,894 (Botsolas; May 15, 1973). Both molded fiberglass fittings and urethane foam fittings are used under the PVC cover. Again, the molded fittings and covers have a uniform outer radius and a uniform inner diameter which are a function of the size of the protrusion or flange outside diameter.

Still another effort at dealing with the problem of covering flanges with insulation is shown in U.S. Pat. No. 3,631,898 (Harley, Jan. 4, 1972). The approach taken in the Harley Patent is one wherein half sections of rigid covering material are machined by grinding the rigid insulation internally to the contour of the fitting to be covered. Again, the outer radius of the fitting is essentially constant and uniform and requires a cover member, usually of tough vinyl, again configured to the contour of the insulation. These prior art covers fail to provide an efficient covering for flanged fittings wherein ease of joining adjacent fittings can be attained, nor do these prior art covers provide a single cover that can cover a variety of pipe insulation thicknesses.

SUMMARY OF THE INVENTION

It is an object of the present invention to provide efficient and economical insulation of flanged fitting members in a piping assembly.

It is another object of the present invention to provide a single fitting cover that has the capacity and latitude to cover a variety of diameters of flanged pipe insulation thicknesses used with the same size flanged pipe fitting.

It is another and further object of the present invention to provide a fitting cover that will enable simple secure and efficient covering of adjacent fittings.

It is a further object of the present invention to provide fitting covers which have the capacity to overlap and provide secure attachment over adjacent fittings secured by flanges.

It is a still further object of the invention to provide a fiberglass insulation wrap around a pipe elbow which is economical to use and which maintains the desired R-value.

To this end, a fitting cover has been provided which is, in essence, formed of two half sections, having on each end toroidally contoured sections. The fitting further includes tapered connecting members which extend from the contour and in which the fitting cover terminates.

A full complement of covers such as 90° elbows, 45° elbows, tee members, and any other fitting in which flanged connections are found, lend themselves to the design of the present invention.

In practice, the cover can be installed over a large range of insulation thicknesses due to the capacity of the covers, by virtue of its inherent design, to be compressed from the intended original design size to smaller sizes. When adjacent fitting members are found in an assembly, the design of the present invention enables overlapping fit of the protruding members to thereby provide an effective efficient and simplified sealing procedure.

Further to this end there is provided a fiberglass insulation wrap which is formed as a continuous strand of removably connected individual wraps of uniform thickness wherein each wrap comprises a pair of opposed ends having essentially the same width and a mid-section between the opposed ends having opposed arcuate sides. The width of the mid-section measured at any point along the opposed arcuate sides is greater than the width of the opposed ends. In a preferred form of the present invention, the end and mid-section of the fiberglass wrap has the approximate shape of the upper portion of an hourglass.

The opposed sides of the individual wraps are removably connected to the ends of adjacent wraps in the strand by the interlocking of fiberglass fibers at the respective ends. It is preferred to provide the strand with score lines at the opposed ends to assist in tearing apart individual wraps from the strand. As a result of the present invention, it is possible to carry a single strand of wraps to an insulation site to insulate several pipe elbows at one time.

Furthermore, the fiberglass insulation of the present invention has fiberglass fibers which are essentially parallel to the pipes comprising the pipe elbow when the fiberglass is wrapped therearound. The thus situated fibers prevent heat loss because the fibers block the flow of heat which radiates outward from the pipe.

DESCRIPTION OF THE DRAWING

The present invention will be better understood when viewed with the following drawings wherein:

FIG. 7 is an isometric view from the inside radius of a forty-five degree elbow cover of the present invention secured to a forty-five degree elbow;

FIG. 8 is a prior art ZESTON 90° fitting; and

FIG. 9 is a continuous strand of removably connected individual insulation wraps for insulating pipe elbows which has been developed for use with the elbow covers of the present invention.

DESCRIPTION OF THE PREFERRED EMBODIMENT

The present invention is suitable for use in any piping installation wherein protrusions occur. The protrusions typically found are flanged fitting connections used to join various fittings either with each other or with straight piping of the assembly.

Figure 1:
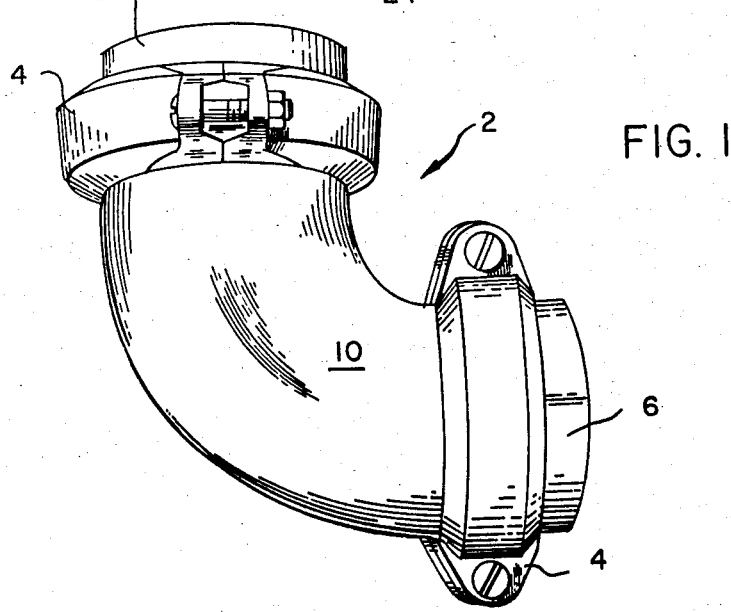
FIG. 1 is an isometric view of a portion of a piping assembly joined by flanged connections such as a VICTAULIC fitting.

As best seen in FIG. 1, an uninsulated piping assembly is shown with conventional mechanical groove type flange connecting members 4 joining pipes 6 and 8 with a ninety degree elbow 10. In practice, it is necessary to insulate the pipes 6 and 8 and the elbow fitting 10. It is necessary also to effect the insulation with a simple, expedient and sure fitting which can provide insulation in the proper amount over the piping, the fitting and the flanged connecting members.

Figure 2:
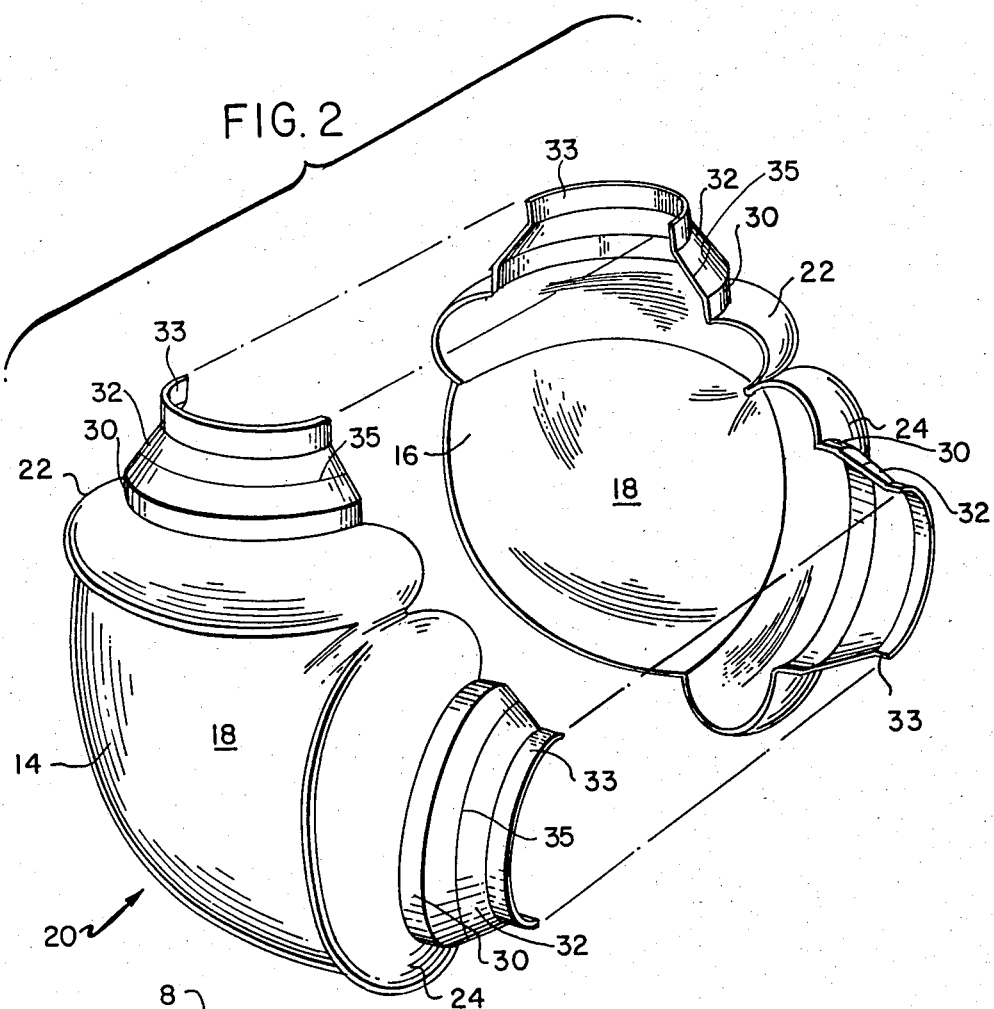
FIG. 2 is an exploded isometric view of two half-sections that combine for form the ninety degree elbow of the present invention.

To this end, the fitting of the present invention has been created. As best seen in FIG. 2, two halfsections 14 and 16 are provided to afford a ninety degree elbow 20 of the present invention. The half sections 14 and 16 have a contoured elbow body 18 on which protrusions 22 and 24 are formed near each end. An essentially flat continuation 30 extends beyond the protrusions 22 and 24 and thereafter a tapered extension 32 is provided at each end. Flat continuations 33 in which elbow cover 20 terminates are provided beyond the tapered extensions 32.

Figure 3:
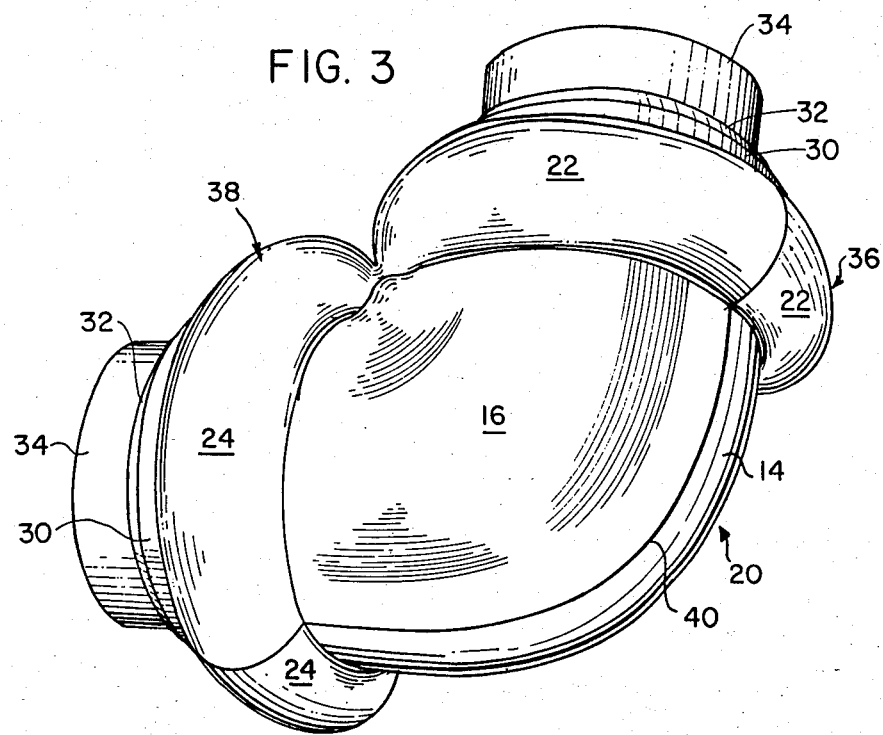
FIG. 3 is an isometric view of a ninety degree elbow cover of the present invention covering the fitting of FIG. 1.

As seen in FIG. 3 the completely assembled ninety degree elbow cover 20 is shown with pipe covering 34 on a piping assembly. The elbow cover 20 is formed by joining the two half-sections along the outside radius 40 of the formed cover 20. Slight overlapping of one section 14 within the other section 16 provides a suitable arrangement for joining the half-sections. In practice, it has been found that the half sections can be connected by any reliable bonding or joining means. For example, if the half-sections 14 and 16 are formed of Polyvinyl Chloride (PVC), a commercial PVC cement or rubber contact adhesive can be used to join the two half-sections 14 and 16. Practice has taught that the two half sections 14 and 16 can be best joined along the outer radius 40 only in the region between the protrusions 22 and 24 to facilitate opening of the cover 20 along the inner radius to fit over the fitting for which it is designed.

When the two half-sections 14 and 16 are joined the protrusions 22 and 24 of one half-section 14 fit nestingly within the protrusions 22 and 24 of the half-section 16 to form toroidal members 36 and 38. The continuations 30 and the tapered extensions 32 of the half section 16 fit within the continuations 30 and the tapered extensions 32 of the half section 14.

As a result of the design the formed fitting covers can be made of a variety of materials such as aluminum, or plastics; e.g. polypropylene or polyvinyl chloride. The resulting structure 20 is a semi-rigid, resilient fitting cover 20 having essentially the configuration of the fitting with toroidal members 36 and 38 to accommodate and fit over the flanges that attach the fittings.

Thus, as previously indicated the cover 20 can be expanded by virtue of the opening (not seen) long the inner radius of the cover 20.

The contoured toroidal protrusions 36 and 38 of the fitting covers 20 enable overlapping fitting when adjacent tee and elbow members are found in a piping assembly.

The tapered extensions 32 facilitate tight secure fit around the covering for straight pipe and the continuations 33 provide a flat surface to bear on adjacent pipe covering. A score line 35 is formed around the tapered extensions at a diameter that coincides with the design diameter of the insulation to be covered. Practice has taught that the taper angle should range from twenty degrees to forty-five degrees with an angle of thirty-five degrees being the preferred angle. It has been found that the thirty-five degree taper will best accommodate Vinyl sealing tape, particularly when the tape is cut to fit an insulation thickness other than the anticipated design thickness.

Figure 4:
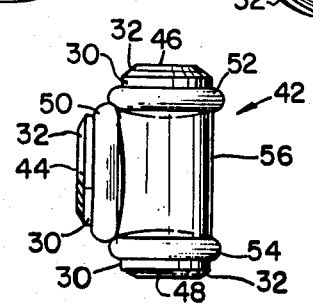
FIG. 4 is an elevational view of the Tee covering of the present invention.

As best seen in FIG. 4, a tee cover 42 of the present invention is shown in assembled form. Therein, by virtue of the fact that three openings 44, 46 and 48 are present in all tee filling members, three toroidal sections 50, 52 and 54 are provided. In the tee cover 42, two identical half sections again form the assembled member. The connection of the two tee half-sections is along the straight line 56 which is opposite the ninety degree opening on the tee. The opening provided to expand the tee cover 42 to enable mounting on a fitting is through the ninety degree opening opposite the joining line 56. Again, flat circular continuation members 30 and tapered extensions 32 are provided at each termination of the tee member.

Figure 5:
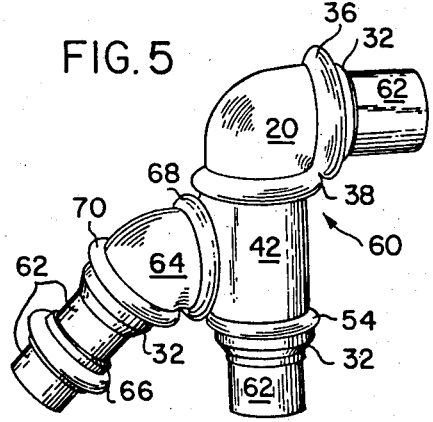
FIG. 5 is an assembly of ninety degree elbow, tee, forty-five degree elbow and coupling all covered with like fitting covers of the present invention.

As best seen in FIG. 5, an assembly of piping 60 is shown covered by various appropriate fitting covers of the present invention. The cover members are comprised of straight piping covers 62, a ninety degree elbow cover 20, a tee cover 42, a forty-five degree cover 64 and a coupling 66. The covering process can be effected in many ways. However when adjacent flanged fittings are covered with the covers of this invention the flat continuation members 30, the tapered extensions 32 and the continuations 33 are trimmed from the overlapping covers.

In the instance shown in FIG. 5, the pipe insulation is first applied and then the fittings are wrapped with blanket-type insulation (not shown). Thereafter, the tee cover 42 is trimmed of all material extending beyond the toroidal protrusions 42 and 50 to be covered and placed over the fitting with the toroidal protrusion covering the flanges. Next, the elbow cover 20 is trimmed to remove the continuation 30 and the tapered extension 32 extending beyond the toroidal protrusion 38, to enable the toroidal protrusion 38 to fit over the toroidal protrusion 50 on the tee cover 42. The forty-five degree elbow is trimmed to remove the continuation member 30 and tapered extension 32 beyond the toroidal protrusion 68 fitting over the toroidal protrusion 54 on the tee cover 42. The continuation 30 and extensions 32 adjacent the toroidal protrusions that do not fit over mating toroidal protrusions are intended to fit tightly around the pipe covering 62 which each engage. Thus, depending on the circumstances, the tapered extensions may be cut along a line 35 which indicates the diameter of the desired design insulation. Finally, the coupling cover 66 which is in essence a single toroidal protrusion formed of two half-sections, is installed.

Figure 6:
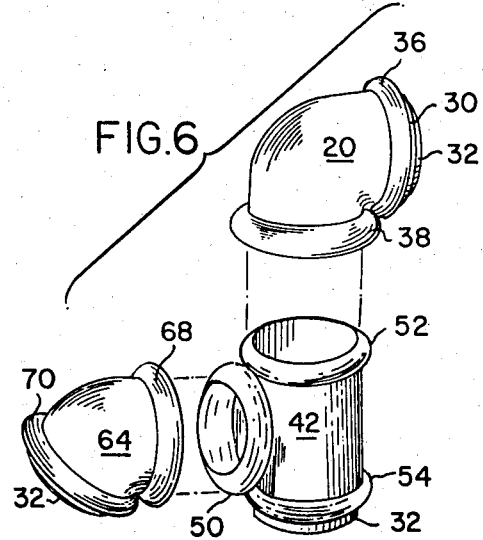
FIG. 6 is an exploded view of thee insulation covers of FIG. 5.

FIG. 6 shows the exploded view of the covers of FIG. 5, with the continuations 30 and tapered extension 32 either present or absent as required by this particular installation.

The forty-five degree elbow cover 64 is shown in FIG. 7 with the inner radius presented. Fairing and trimming is shown by the bevel cuts 76 and 78 on the toroidal protrusion 68. The cover 64 is held in place by pins 80 that transpierce the overlapping edges of the cover 64 along the inner radius.

As best seen in FIG. 8, a prior art ZESTON elbow is shown with the constant outer radius rather than toroidal protrusions to accommodate pipe flanges. Thus, the prior art fitting is incapable of providing overlapping joinder of associated fittings.

Any conventional insulation is suitable for use with the pipe covers of the present invention. A preferred form of insulation is shown in FIG. 9. Referring to FIG. 9, a fiberglass insulation strand 90 comprises individual removably connected fiberglass wraps 92 having a pair of opposed ends 98 which are removably connected to the ends 98 of adjacent wraps 92 to thereby form the continuous strand 90. The ends 98 of adjacent wraps 92 are held together by the inherent nature of the fiberglass fibers which interlace at the ends 98. The individual wraps 92 may be separated from the strand 90 by tearing or pulling apart at the respective ends 98. To obtain a smooth end, it is desirable to provide score lines 94 so that the wraps 92 can be easily separated in an even line by tearing.

The wraps 92 also comprise a mid-section 96 formed by arcuate sides 93 connecting the opposed ends 98. The width of the mid-section 96 is greater than the width of the ends 98. The strands 90 can have different thicknesses depending on need. Accordingly, the strands 90 are maade of wraps 92 having a uniform thickness.

In operation, a first end 98 of the wrap 92 is placed over the inner radius of an elbow and the other end 98 is brought around the outer radius of the elbow so that the mid-section 96 is aligned with and covers the outer radius of the elbow. The ends 98 therefore overlap at the inner radius of the elbow or at least abut each other so that the fibers of the ends 98 interconnect to thereby secure the wrap 92 in place. If necessary, additional well-known connecting means may be used to connect the ends 98 about the inner radius of the elbow. Thereafter, a pipe covering such as those disclosed herein is secured over the wrap 92 to complete the insulation of the pipe elbow.

Additional wraps 92 may be used as described above to provide a multilayer of fiberglass insulation around the elbow. As a result of the present invention, there is very little bunching in vicinity of the inner radius because only as much insulation material as is necessary to insulate the inner radius of the elbow is present in the wrap of the present invention. Accordingly, there is little, if any insulation value lost at the inner radius as a result of voids or bunching of the insulation. Furthermore, since the fibers of the wrap 92 are generally horizontal to the pipe, heat loss is minimized.

What is claimed is:

1. Fiberglass insulation for use in insulating a pipe elbow, said insulation comprising a continuous strand of a plurality of removably connected fiberglass wraps, each of said wraps comprising a pair of opposed ends having essentially the same width and a mid-section connecting the opposed ends having opposed arcuate sides wherein the width of the mid-section measured at any point along the opposed arcuate sides is greater than the width of the opposed ends.

2. The fiberglass insulation of claim 1, wherein the fiberglass wrap is held together as part of the strand by the interlocking of the fiberglass fibers at the respective ends of adjacent wraps.

3. The fiberglass insulation of claim 1, wherein each wrap of the strand is defined by a pair of score lines whereby the wrap may be pulled apart from the strand at the score line.

4. The fiberglass insulation of claim 1, wherein the wrap has an essentially hourglass shape and wherein the opposed ends of the wrap are placed around the inner radius of the pipe elbow and the mid-section is placed around the outer radius of the pipe elbow.

5. The fiberglass insulation of claim 1, wherein the insulation contains fibers, said fibers are essentially parallel to the pipe elbow.

6. Fiberglass insulation for use in insulating a pipe elbow comprising a wrap made of fiberglass insulation comprising a pair of opposed ends having essentially the same width and a midsection connecting the opposed ends and having opposed arcuate sides wherein the width of the midsection measured at any point along the opposed arcuate sides is greater than the width of the opposed ends.

7. The fiberglass insulation of claim 6, wherein the wrap has an essentially hourglass shape and wherein the opposed ends of the wrap are placed around the inner radius of the pipe elbow and the mid-section is placed around the outer radius of the pipe elbow.

8. The fiberglass insulation of claim 6, wherein the insulation contains fibers, said fibers are essentially parallel to the pipe elbow.

* * * * *